United States Patent [19]

Petheram

[11] Patent Number: 4,642,809
[45] Date of Patent: Feb. 10, 1987

[54] SLAB ACTIVE LASING MEDIUM

[75] Inventor: John C. Petheram, Middlesex County, N.J.

[73] Assignee: RCA Corporation, Princeton, N.J.

[21] Appl. No.: 707,042

[22] Filed: Feb. 28, 1985

[51] Int. Cl.[4] .............................................. H01S 3/06
[52] U.S. Cl. ........................................ 372/66; 372/71
[58] Field of Search ............... 372/66, 71, 84, 69; 307/425, 426

[56] References Cited

U.S. PATENT DOCUMENTS 3,571,607 3/1971 Giordmaine ........................ 307/426
3,933,406 9/1976 Lax et al. ............................ 307/425

OTHER PUBLICATIONS

DeShazer et al; "Laser Mode Selection by Internal Reflection Prisms"; Appl. Opt., vol. 6, No. 3, Mar. 1967, p. 431.

Primary Examiner—Leon Scott, Jr.
Attorney, Agent, or Firm—Joseph S. Tripoli; George J. Seligsohn

[57] ABSTRACT

The use of slabs having end faces cut at substantially the critical angle in three different embodiments of a slab laser provides benefits not possessed by conventional cylindrical active lasing mediums or by slab active lasing mediums having end faces cut at Brewster's angle.

11 Claims, 7 Drawing Figures

SLAB ACTIVE LASING MEDIUM

BACKGROUND OF THE INVENTION

I. Field of the Invention

This invention relates to slab lasers and, more particularly, to a slab active lasing medium therefor having an improved design.

II. Description of the Prior Art

Optically-pumped lasers employing an active lasing medium having a cylindrical configuration or, alternatively, a slab configuration are both known in the art. Conventional slab lasers have the end faces of the slab cut at Brewster's angle to minimize intra-cavity reflection losses. The slab is situated within an optical resonant cavity and the laser resonator modes of the laser wave energy traveling through the slab propagate in a zigzag manner down the length of the slab by total internal reflection. Total internal reflection results from the fact that the internal angle of incidence at the slab boundary of this propagating wave energy is always very much larger than the critical angle of incidence for the active lasing medium material comprising the slab. A typical example of the material comprising the active lasing medium is neodymium glass (Nd/glass). Nd/glass exhibits an index of refraction that is about equal to 1.5, a Brewster angle $\theta_B$ of about 56°, an angle of incidence $i_B$ of about 67°, and a critical angle $\theta_C$ of about 42°.

SUMMARY OF THE INVENTION

In accordance with the principles of the present invention, the end faces of the slab are cut at substantially the critical angle $\theta_C$, rather than at Brewster's angle $\theta_B$ (as is conventional). More specifically, the present invention is directed to a slab to be used as an active lasing medium of a slab laser for wave energy traveling the length of the slab between the end faces thereof. The slab is composed of a material exhibiting a given index-of-refraction which exceeds that of its surroundings by an amount such that the critical angle for the traveling wave energy has a predetermined value. Each of the end faces of the slab is cut at an angle having a value such that the traveling wave energy in the slab is incident at that end face at substantially the predetermined value of the critical angle.

DESCRIPTION OF THE PREFERRED EMBODIMENTS

Figure 1:
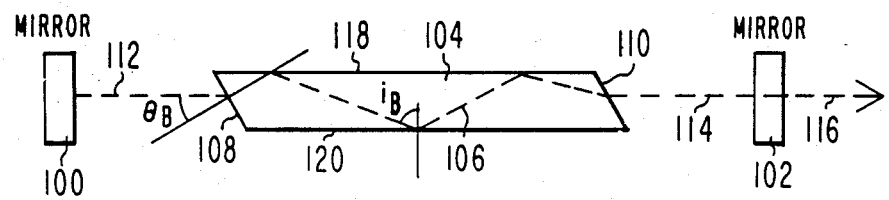
FIG. 1 diagramatically illustrates a conventional slab laser of the prior art.

The conventional slab laser, shown in FIG. 1, comprises an optical resonant cavity formed by mirror 100 and mirror 102 and a slab 104 situated within the cavity. Slab 104 operates as an active lasing medium for wave energy 106 traveling the length of slab 104 between end faces 108 and 110 thereof. Slab 104 is composed of a material, such as e.g. Nd/glass, exhibiting a given index of refraction (e.g. about 1.5) which exceeds that of its surroundings (usually air having an index of refraction of essentially unity). End face 108 is cut at Brewster's angle $\theta_B$ with respect to the angle of incidence of wave energy 112 reflected from mirror 100 and traveling in the air between mirror 100 and slab 104. End face 110 is also cut at Brewster's angle $\theta_B$ with respect to the angle of incidence of wave energy 114 reflected from mirror 102 and traveling in the air between mirror 102 and slab 104. At least one of mirrors 100 and 102 (e.g. mirror 102) is partially transmissive, thereby deriving laser output wave energy 116.

As indicated in FIG. 1, wave energy 106, traveling within slab 104, travels a zigzag path, being totally reflected at both top boundary 118 and bottom boundary 120 of slab 104. More specifically, refraction of propagating laser wave energy in passing between air and the active lasing medium at each of Brewster-angle end faces 108 and 110 results in wave energy 106 traveling within slab 104 to be incident on respective slab boundaries 118 and 120 at an angle of incidence $i_B$ which is greater than the value of the critical angle $\theta_C$. For instance, in the case in which slab 104 is comprised of Nd/glass (surrounded by air), and end faces 108 and 110 are each cut at a Brewster angle value $\theta_B$ of substantially 56°, wave energy 106 traveling within slab 104 is incident on boundaries 118 and 120 at an angle of incidence $i_B$ of substantially 67°. 67° is much larger than a value of substantially 42°, the critical angle $\theta_c$ of Nd/glass.

The conventional slab laser shown in FIG. 1 exhibits relatively poor transverse mode selection for a paraxial input ray of wave energy while it is traveling in slab 104. More specifically, those unwanted transverse modes of the wave energy traveling in slab 104 that have angles of incidence at boundaries 118 and 120 of slab 104 somewhat less than $i_B$ (as well as those that have angles of incidence greater than $i_B$) will still have angles of incidence that are larger than the value of the critical angle $\theta_C$. Therefore, these unwanted transverse modes of wave energy traveling in slab 104 do not escape from the slab at boundaries 118 or 120, but are totally reflected, and, therefore, are present in the paraxial ray of laser output wave energy 116.

It is known that the gain length for a slab laser employing a slab of predetermined physical dimensions depends upon the optical path length of the zigzag wave energy 106 traveling within the slab. This optical path length, to a close approximation, is proportional to the ratio of the respective tangent of the critical angle $\theta_c$ to the tangent of the angle of incidence $i_B$ of traveling-wave energy 106 in slab 104 (i.e. $\tan \theta_c / \tan i_B$). In the case of the conventional slab laser shown in FIG. 1, in which the value of the angle of incidence $i_B$ is much greater than that of the critical angle $\theta_c$, the optical path length, and hence the gain length, of a slab of predetermined dimensions is relatively small.

Figure 2:
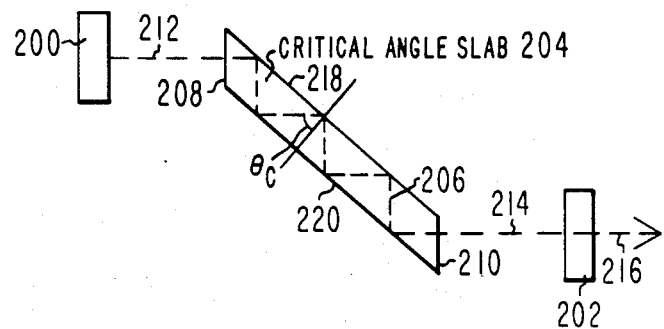
FIG. 2 diagramatically illustrates a first embodiment of a slab laser incorporating the present invention.

The slab laser of the present invention, shown in FIG. 2, is similar to the conventional slab laser, shown in FIG. 1, in many respects. Specifically, the slab laser of the present invention, shown in FIG. 2, comprises an optical resonant cavity formed by mirror 200 and mirror 202 and a slab 204 situated within the cavity. Slab 204 operates as an active lasing medium for wave energy 206 traveling the length of slab 204 between end faces 208 and 210 thereof. Slab 204 is composed of a material, (e.g. Nd/glass) exhibiting a given index of refraction (e.g. about 1.5) which exceeds that of its surroundings (usually air having an index of refraction of essentially unity). Also, mirror 202 is partially transmissive for deriving output wave energy 216.

However, the structure of the slab laser of the present invention, shown in FIG. 2, differs from that of the conventional slab laser, shown in FIG. 1, in several important respects. First, end face 208 is cut at the critical angle $\theta_C$ (rather than being cut at Brewster's angle $\theta_B$) with respect to the angle of incidence of wave energy 212 reflected from mirror 200 and traveling in the air between mirror 200 and slab 204. End face 210 is also cut at the critical angle $\theta_C$ (rather than at Brewster's angle $\theta_B$) with respect to the angle of incidence of wave energy 214 reflected from mirror 202 and traveling in the air between mirror 202 and slab 204. Second, critical-angle slab 204 is oriented with respect to mirrors 200 and 202 so that wave energy 206 traveling in slab 204 is incident at each of end faces 208 and 210 at substantially the predetermined value of the critical angle $\theta_C$. This is accomplished in the first embodiment of the present invention, shown in FIG. 2, by situating mirror 200 so that its optical axis is oriented substantially perpendicular to the plane of end face 208 and situating mirror 202 so that its optical axis is oriented substantially perpendicular to the plane of end face 210. Thus, substantially no refraction takes place when wave energy 212 enters or leaves slab 204 at end face 208 or when wave energy 214 enters or leaves slab 204 at end face 210. Furthermore, because respective end faces 208 and 210 of critical-angle slab 204 are oriented substantially perpendicular to the respective optical axes of mirrors 200 and 202, wave energy 206 traveling the length of slab 204 between end faces 208 and 210 thereof is incident at both top boundary 218 and bottom boundary 220 of slab 204 at substantially the critical angle $\theta_C$, as indicated in FIG. 2. This wave energy 206, which is incident at top and bottom boundaries 218 and 220 at substantially the predetermined value of the critical angle $\theta_C$, is totally reflected and contributes to the laser output wave energy 216 derived from partially transmissive mirror 202.

Figure 3:
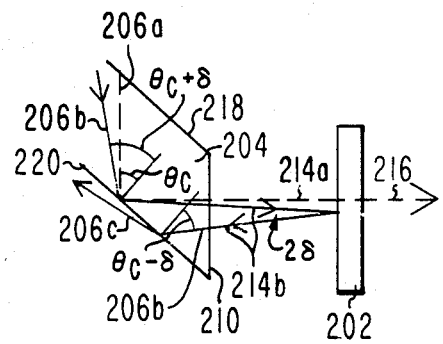
FIG. 3 is a diagram helpful in demonstrating the reason for the high degree of transverse mode selection of the slab laser of FIG. 2.

Most important, as demonstrated in FIG. 3, the critical-angle slab laser of the present invention exhibits excellent transverse mode selection for a paraxial input ray of wave energy while it is traveling back and forth within critical-angle slab 204.

It is apparent that those unwanted transverse modes of wave energy 206 traveling in critical-angle slab 204 that are incident on boundary 218 or boundary 220 at even slightly less than the predetermined value of the critical angle of critical-angle slab 204 will escape from slab 204 through the boundary. Therefore, such unwanted transverse modes will not be present in laser output wave energy 216. However, this is not true of any unwanted transverse mode wave energy 206 traveling in critical-angle slab 204 which is incident on boundary 218 or 220 at an angle larger than the predetermined value of the critical angle $\theta_C$. Instead, these latter unwanted transverse modes are totally reflected. Therefore, they propagate the length of critical-angle slab 204, where they are incident on each one of end faces 208 and 210.

Assuming, for illustrative purposes, this one end face is end face 210, FIG. 3 demonstrates the reason why even unwanted transverse modes having an angle of incidence at boundary 218 or 220 greater than the predetermined value of the critical angle $\theta_C$ are eliminated by the critical-angle slab laser of the present invention. In FIG. 3, the reference numerals 206a and 206b, respectively, represent (1) the wanted transverse mode portion of wave energy 206, which has an angle of incidence at boundary 220 substantially equal to the predetermined value of the critical angle $\theta_C$ and (2) an unwanted transverse mode portion of wave energy 206 having an angle of incidence at boundary 220 equal to $\theta_C + \delta$ (i.e. slightly larger than the predetermined value of the critical angle $\theta_C$). Both wave energy portions 206a and 206b incident on boundary 220 are totally reflected and then emitted into the air from end face 210. Specifically, they are represented in FIG. 3 by respective portions 214a and 214b of paraxial ray 214 of FIG. 2. The wanted transverse mode wave energy portion 214a, which is incident on mirror 202 at a substantially zero angle of incidence, is retroreflected, back on itself into critical-angle slab 204 as wave energy portion 206a through end face 210. Therefore, the wanted transverse mode is still incident on boundary 220 at the predetermined value of the critical angle $\theta_C$. However, neglecting any slight refraction at end face 210, the angle of incidence of unwanted transverse mode wave energy portion 214b on mirror 202 is $\delta$. As indicated in FIG. 3, after reflection from mirror 202 and return to critical-angle slab 204 through end face 210 as wave energy portion 206b, the unwanted transverse mode wave energy 206b is incident on bottom boundary 220 at an angle of incidence ($\theta_C - \delta$), which is slightly less than the predetermined value of the critical angle $\theta_C$. Therefore, this unwanted transverse mode of wave energy 206b escapes slab 204 through bottom boundary 220, as indicated by 206c. Because lasing requires multiple reflections back and forth through the active lasing medium, and this occurs only for the wanted transverse mode, the critical-angle slab laser of the present invention provides a high degree of transverse mode selection.

By comparing FIG. 2 with FIG. 1, it is apparent that the total length of the zigzag path of the wave energy 206 traveling in critical-angle slab 204 is significantly longer than the total length of the zigzag path of the wave energy 106 traveling in conventional slab 104. This is because the boundary angle of incidence in FIG. 2 is substantially the critical angle $\theta_C$ (about 42° in Nd/glass), while, in FIG. 1, the boundary angle of incidence $i_B$ (about 67° in Nd/glass) is much greater than the value of the critical angle $\theta_C$. As discussed above, to a close approximation, the gain length of the slab of a slab laser in proportional to $\tan \theta_C / \tan i_B$. For Nd/glass, this represents an increase in gain of nearly 2.5.

The first embodiment of the present invention shown in FIG. 2 provides a high degree of transverse mode selection only for wave energy polarized in the single dimension parallel to the critical-angle cut of the end face plane of each of end face 208 and 210. However, the second embodiment of the present invention, shown in plan view in FIG. 4a and in side view in FIG. 4b, provides a high degree of transverse mode selection in both orthogonal transverse dimensions parallel to the end face plane.

More specifically, this second embodiment of the present invention is comprised of an optical resonant cavity composed of mirrors 400 and 402, in which is situated both serially-positioned first critical-angle slab 404-1 and second critical-angle slab 404-2. Mirror 402 is partially transmissive for deriving laser output wave energy 416. The respective end faces 408-1 and 410-1 of the first critical-angle slab 404-1 and the respective end faces 408-2 nd 410-2 of the second critical-angle-slab dimension 404-2 all lie in substantially parallel planes. However, as indicated in FIGS. 4a and 4b, the two slabs are rotated 90° relative to one another, so that the critical-angle-cut dimension of respective end faces 408-2 and 410-2 of second critical-angle slab 404-2 is orthogonally oriented with respect to the critical-angle-cut-dimension of end faces 408-1 and 410-1 of first critical-angle slab 404-1.

Figure 4A:
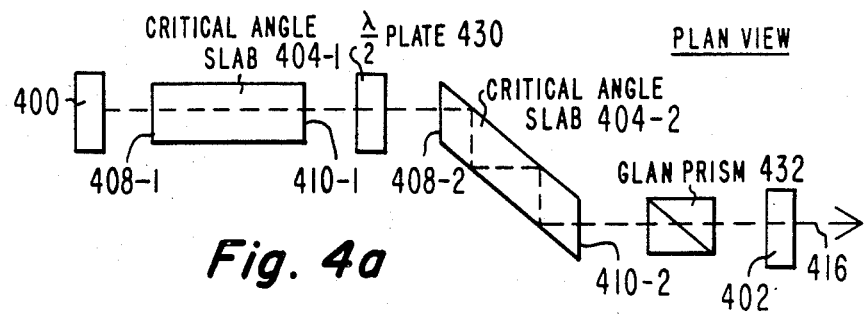
FIGS. 4a and 4b, respectively, diagramatically illustrate plan and side views of a second embodiment of a slab laser incorporating the present invention.
Figure 4B:
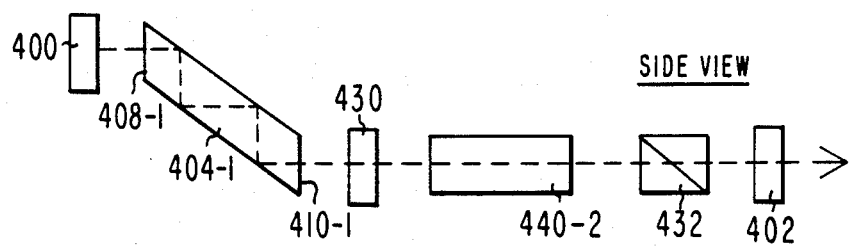

As is further indicated in FIGS. 4a and 4b, the first and second critical-angle slabs 404-1 and 404-2 are disposed in spaced serial relationship with respect to one another with half-wave ($\lambda/2$) plate 430 located therebetween for the purpose of rotating substantially 90° the direction of polarization of wave energy traveling in either direction between critical-angle slab 404-1 and critical-angle slab 404-2. In addition, situated between end face 410-2 of second critical-angle slab 404-2 and mirror 402 is a polarizing means, such as Glan prism 432, for plane-polarizing wave energy in a direction parallel to the critical-angle cut of the end face plane of end face 410-2.

The presence of half-wave plate 430 and Glan prism 432 ensure that the plane-polarization of wave energy is parallel to the critical-angle-cut dimension in both first and second critical-angle slabs 404-1 and 404-2. Further, this increases transverse mode selectivity, since the reflectivity near the critical angle $\theta_C$ changes more rapidly for parallel polarization than for perpendicular polarization.

A critical-angle slab is particularly suitable for use in a traveling-wave laser. As known in the art, the emission spectrum from an active laser medium, such as Nd/glass, can be narrowed significantly by operating it in the traveling wave mode. Another known benefit of a traveling wave laser is that it eliminates spatial hole burning, allowing most of the stored energy to be extracted from the laser medium.

Figure 5:
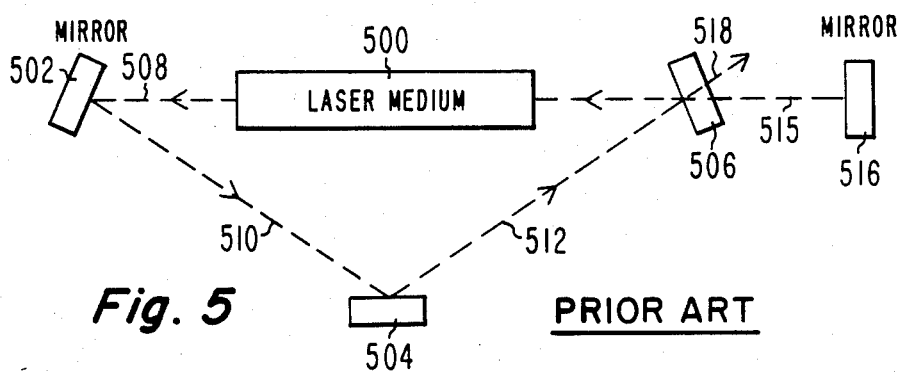
FIG. 5 diagramatically illustrates a conventional traveling wave laser known in the prior art.

FIG. 5 is a diagram of a conventional traveling wave laser. As indicated in FIG. 5, a conventional traveling wave laser comprises an active laser medium (e.g. Nd/glass) 500 situated within an optical resonant cavity "ring" comprised of three mirrors 502, 504 and 506. Mirror 506 is partially transmissive. Wave energy traveling in a counter-clockwise direction through laser medium 500 is emitted from the left end face of laser medium 500 as beam 508, traveling in the direction of the arrow. Respective mirrors 502, 504 and 506 are oriented with respect to laser medium 500, and one another, as shown in FIG. 5, so that beam 508, after reflection from mirror 502, derives first reflected beam 510 traveling toward and incident on mirror 504. Mirror 504, in turn, derives reflected beam 512 traveling toward and incident on mirror 506. Then, mirror 506, derives reflected beam 514 traveling toward and incident on the right end face of laser medium 500.

Wave energy is intended to travel through laser medium 500 solely in a certain single direction (i.e. counter-clockwise laser medium 500 in the example shown in FIG. 5). The traveling wave generated by the "ring" of mirrors 502, 504 and 506 and laser medium 500 can intrinsically operate in either a clockwise or in a counter-clockwise mode. In order to ensure that only a desired single one of these two modes propagates, an isolation element (e.g. a Faraday rotator or, as employed in FIG. 5, a fourth feedback mirror 516) is required. Any attempt by a traveling-wave laser to operate in the undesired clockwise mode results in laser medium 500 emitting wave energy from its right end face that is partially transmitted through mirror 506 and is then retroreflected by feedback mirror 516. This retroreflected wave energy travels in a counter-clockwise mode, back through partially transmissive mirror 506 and the right end face into laser medium 500. Thus, the presence of feedback mirror 516 ensures that traveling wave laser shown in FIG. 5 operates in a counter-clockwise mode. Further, in the desired counter-clockwise mode, partially transmissive mirror 506 transmits a portion of beam 512 as output laser wave energy 518.

Slab lasers have the potential of being much more energetic devices than cylindrical rod lasers, both because of the longer path taken through the medium and the intrinsic thermal compensation of a slab. Hence, a traveling-wave slab laser should be a relatively simple way of achieving high brightness radiation.

Figure 6:
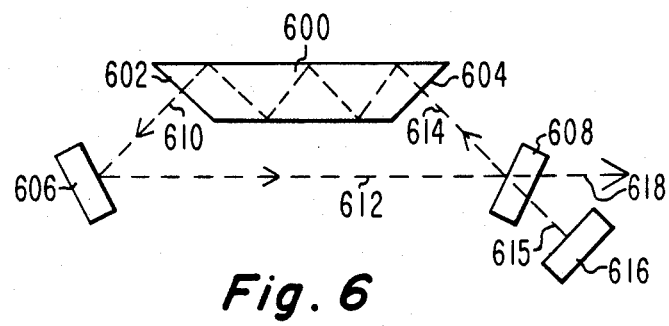
FIG. 6 diagramatically illustrates an embodiment of a traveling wave slab laser incorporating the present invention.

FIG. 6 illustrates a critical-angle slab traveling-wave laser forming a third embodiment of the present invention. An active laser medium slab 600, which may be comprised of Nd/glass, includes end face 602 cut at the predetermined value of the critical angle and end face 604 also cut at the predetermined value of the critical angle. However, as indicated in FIG. 6, the respective end faces 602 and 604 do not lie in parallel planes (as is the case in the first and second embodiments of FIG. 2 and FIGS. 4a and 4b). Instead, end face 602 lies in a first plane and end face 604 lies in a second plane that intersects the first plane at a dihedral angle having a value substantially equal to the difference between $\pi$ radians and twice the critical angle. The traveling-wave critical-angle slab laser shown in FIG. 6 further comprises an optical resonant cavity made up of first mirror 606 and partially transmissive second mirror 608. The respective mirrors 606 and 608 are oriented with respect to critical-angle slab 600 and one another so that wave energy beam 610, emitted perpendicular to the plane of end face 602, travels toward and is incident on mirror 606 at an angle of incidence which derives reflected beam 612. Reflected beam 612 travels toward and is incident on mirrors 608 at an angle of incidence the derives reflected beam 614. Reflected beam 614, which is oriented perpendicular to the plane of end face 604, travels toward and is incident on end face 604 at a substantially zero angle of incidence.

Feedback mirror 616 causes any clockwise mode wave energy 615 passing through partially transmissive mirror 608 to be reflected back to laser medium 600, thereby ensuring a counter-clockwise mode for the traveling-wave critical-angle slab laser shown in FIG. 6. At the same time, partially transmissive mirror 608, operating in the desired clockwise mode, derives output laser wave energy 618.

There are several advantages of the traveling-wave critical-angle slab laser shown in FIG. 6 compared to the prior-art traveling-wave slab laser shown in FIG. 5. First, the FIG. 6 traveling-wave slab laser of the present invention employs an optical resonant cavity comprised of only two mirrors, while the prior-art traveling-wave laser of FIG. 5 employs an optical resonant cavity requiring three mirrors. The two-mirror approach employed in the present invention provides a traveling-wave laser which is more stable than the three mirror approach employed by the prior-art traveling-wave laser. Second, because the return path is parallel to the slab, a very compact system can be constructed. Third, in order to construct the prior-art conventional traveling-wave laser of FIG. 5, in a compact space, mirror 504 needs to be oriented relative to beam 510 near grazing incidence. This has been shown to result in large variations in reflectivity for small changes in angle, and hence places severe constraints on mechanical stability. In the construction of the traveling-wave critical-angle slab laser of the present invention, shown in FIG. 6, the angle of incidence is always $(90°-\theta_C)/2$, irrespective of the distance of the slab. For Nd/glass, this angle is about 24° and conventional laser mirrors perform well at a 24° angle. Fourth, the traveling-wave critical-angle slab laser, forming the third embodiment of the present invention, provides a high degree of transverse mode selection, for the same reasons discussed above in connection with the first and second embodiments of the present invention.

What is claimed is:

1. A slab to be used as an active lasing medium for a slab laser having wave energy traveling in a zig-zag path the length of said slab between the end faces thereof, to provide a gain length for said slab laser which is proportional to the total length of said zig-zag path said slab being composed of a material exhibiting a given index-of-refraction which exceeds that of its surroundings by an amount such that the critical angle for said traveling wave energy has a predetermined value;
    said slab having each of its end faces cut at an angle having a value such that said traveling wave energy in said slab is incident at that end face at substantially the predetermined value of said critical angle to substantially increase the total length of said zig-zag path, and hence said gain length of said slab laser.

2. In a slab laser comprising an optical resonant cavity and a slab situated within said cavity which slab operates as an active lasing medium for wave energy traveling in a zig-zag path the length of said slab between the end faces thereof, to provide a gain length for said slab laser which is proportional to the total length of said zig-zag path said slab being composed of a material exhibiting a given index of refraction which exceeds that of its surroundings by an amount such that the critical angle of said traveling wave energy has a predetermined value,
    each of said end faces faces of said slab is cut at an angle having a value such that said traveling wave energy in said slab is incident at that end face at substantially the predetermined value of said critical angle to substantially increase the total length of said zig-zag path, and hence said gain length of said slab laser.

3. The slab laser defined in claim 2, wherein:
said end faces of said slab lie in parallel planes; and
said resonant cavity is comprised of a first mirror having its optical axis oriented substantially perpendicular to the plane of a first of said end faces of said slab for reflecting laser wave energy emitted from said first end face and incident on said first mirror back into said slab, and a second mirror having its optical axis oriented substantially perpendicular to the plane of a second of said end faces of said slab for reflecting laser wave energy emitted from said second end face and incident on said second mirror back into slab.

4. The slab laser defined in claim 3, wherein at least one of said first and second mirrors is partially transmissive, whereby said one mirror transmits a portion of said laser wave energy incident thereon as an output from said slab laser.

5. The slab laser defined in claim 2, wherein said resonant cavity includes optical means for returning laser wave energy emitted from a first of said end face of said slab to a second end face of said slab over a wave energy path that is external to said slab.

6. The slab laser defined in claim 5, wherein:
    a first of said end faces of said slab lies in a first plane and a second of said end faces of said slab lies in a second plane that intersects said first plane at a dihedral angle having a value substantially equal to the difference between $\pi$ radians and twice said critical angle; and
    said optical means comprises a first mirror having its optical axis oriented at a first given angle with respect to a perpendicular to said first plane and a second mirror having its optical axis oriented at a second given angle with respect to a perpendicular to said second plane, said first and second mirrors and said first and second end faces of said slab being located and oriented with respect to one another such that laser wave energy emitted from said first end face of said slab is incident on, and hence reflected from, said first mirror at said first given angle, said reflected laser wave energy from said first mirror is incident on, and hence reflected from, said second mirror at said second given angle, and said reflected laser wave energy from said second mirror is incident on said second end face of said slab at a substantially zero angle of incidence.

7. The slab laser defined in claim 6, wherein said second mirror is partially transmissive, and a third mirror having its optical axis oriented substantially parallel to said laser wave energy reflected from said second mirror, said third mirror being situated on the other side of said second mirror from said second end face of said slab,
    whereby laser wave energy is constrained to travel only in a direction from said first mirror toward said second mirror, and said second mirror transmits a portion of said laser wave energy incident thereon as an output from said slab laser.

8. The slab laser defined in claim 2, wherein:
said slab laser further includes a second slab situated within said cavity in serial relationship with said first-mentioned slab, said second slab operating as an active lasing medium for wave energy traveling along the length of said slab between the end faces thereof, said second slab being composed of said material exhibiting said given index of refraction, each of said end faces of said second slab being cut at an angle having a value such that said wave energy of said second slab is incident at that end face at substantially the predetermined value of said critical angle;
said end faces of said first-mentioned slab and said end faces of said second slab all lying in substantially parallel planes with said critical-angle cut of each of said end faces of said second slab being oriented substantially perpendicular to the critical-angle cut of said end faces of said first-mentioned slab;
said resonant cavity being comprised of a first mirror having its optical axis oriented perpendicular to a first end face of said first-mentioned slab for reflecting laser wave energy emitted from said first end face of said first-mentioned slab and incident thereon back into said first end face of said first-mentioned slab, a second mirror having its optical axis oriented perpendicular to a first end face of said second slab for reflecting laser wave energy emitted from said first end face of said second slab back into said first end face of said second slab; and polarization means situated within said resonant cavity for maintaining the laser wave energy in each of said slabs plane polarized in a direction substantially parallel to a plane of each one of said respective first mentioned and second slabs which includes the critical angle of the critical-angle cut of each of said end faces of that one slab.

9. The slab laser defined in claim 8, wherein said polarization means includes:

a plane-wave polarizer situated in the path of laser wave energy emerging from an end face of a single one of said first-mentioned slab and said second slab, said polarizer being oriented for plane-polarizing said laser wave energy traveling in said single one of said slabs in a direction substantially parallel to that plane of said single one of said slabs which includes the critical angles of the critical-angle cut of each of said end faces of said single one of said slabs; and a half-wave plate situated between a second end face of said single one of said first-mentioned and second slabs and a second end face of the other one of said first-mentioned and second slabs for rotating the plane of polarization of said laser wave energy transmitted in either direction through said half-wave plate by substantially ninety degrees, whereby the plane of polarization of said laser wave energy in said other one of said slabs is maintained substantially parallel to that plane of said other one of said slabs which include the critical angles of the critical-angle cut of each of said ends of said other one of said slabs.

10. The slab laser defined in claim 9, wherein:

said first mirror is partially transmissive, whereby said first mirror transmits a portion of said laser wave energy as the output from said slab laser, and said plane-wave polarizer is situated in said resonant cavity between said first end face of said first-mentioned slab and said first mirror.

11. The slab laser defined in claim 9, wherein: said plane-wave polarizer is a Glan prism.

* * * * *

UNITED STATES PATENT AND TRADEMARK OFFICE
CERTIFICATE OF CORRECTION

PATENT NO. : 4,642,809

DATED : February 10, 1987

INVENTOR(S) : John Campbell Petheram

It is certified that error appears in the above-identified patent and that said Letters Patent is hereby corrected as shown below:

Column 7, lines 49 and 50 should be --said slab having each of its end faces cut at an angle having a value such that said traveling wave--.

Signed and Sealed this

Twenty-seventh Day of October, 1987

Attest:

DONALD J. QUIGG

Attesting Officer

Commissioner of Patents and Trademarks